Feb. 21, 1967

G. J. HAUFLER ET AL 3,305,001

PLURAL ZONE HEATING AND COOLING SYSTEM

Filed Oct. 26, 1964

INVENTORS.
GEORGE J. HAUFLER
BY WALTER M. HASSENPLUG
OTTO J. NUSSBAUM

Robert S Crooks

ATTORNEY

Fig. 6

United States Patent Office 3,305,001
Patented Feb. 21, 1967

3,305,001
PLURAL ZONE HEATING AND COOLING SYSTEM
George J. Haufler, Philadelphia, Walter M. Hassenplug, Huntingdon Valley, and Otto J. Nussbaum, Morrisville, Pa., assignors to International Telephone and Telegraph Corporation, Nutley, N.J., a corporation of Maryland
Filed Oct. 26, 1964, Ser. No. 406,381
1 Claim. (Cl. 165—22)

This invention relates to a system for providing heating and cooling, as may be required, to a medium in one or more spaces.

More particularly, this invention relates to a heating and air-conditioning system, and to units to be utilized in such a system, suitable for employment in apartment houses, schools, motels, and other buildings in which the air in certain rooms of the buildings may require radically different thermal treatment than the air in certain other rooms of the same buildings at the same time.

Still more particularly, this invention relates to a system, and to units for employment in such a system, permitting cooling of certain rooms in a building to take place simultaneously with heating of certain other rooms in the building, the heat removed from the rooms undergoing cooling being furnished to the rooms requiring heating, rather than being wasted.

There are presently many types of heating and air-conditioning systems in use in multi-unit buildings such as motels and apartment houses. At certain times of the year, such as late spring and early fall, there are often days when it would be desirable to be able to cool the side of such buildings upon which the sun is shining, while at the same time heating other portions of the building which do not derive sufficient heat from the sun. With many of the systems for heating and air conditioning which are now in use, it is not possible by means of a central system to achieve simultaneous heating and cooling of different spaces in the same building. In other words, if the central system is producing heat, it is not simultaneously possible to use the central system for air conditioning certain spaces in the building.

A partial solution of this problem has been to leave the central heating system in operation while unit air conditioners are employed in certain spaces of the building to reduce the temperature of the air in those spaces to a comfortable level. A defect in this type of system is inherent in the fact that the heat removed from the air in the rooms undergoing cooling is exhausted to the outdoors and wasted at the same time when the central heating system is being required to provide heating to the air in other spaces in the same building.

Another disadvantage inherent in many package air conditioners of conventional "through-the-wall" types lies in the fact that installation "through-the-wall" exposes the air-conditioning unit to the elements and necessitates expensive installation procedures which also weaken the structure of the building. Other package air conditioners reject heat into a water line for which a drainage path must be provided either through the wall or to the drainage sewer of the building.

Still other central systems provide to the air spaces in a building either heated water or chilled water, depending upon whether the majority of the spaces require heating or cooling. These types of systems thus cannot insure comfortable temperatures in some of the spaces which do not happen to require the same treatment as the majority of other spaces in the building. Moreover, these types of system require both a boiler and a chiller respectively for heating and chilling the water which is used as the heat-transfer fluid. When chilled water is supplied from the chiller to the spaces throughout the building which are to be air conditioned, the temperature of the supply pipes falls below the dew point of the air, thereby causing the formation of condensation on the pipes, unless they are insulated to decrease contact of atmospheric air with the chilled pipes. Still further, there is extensive absorption of heat from the air by the chilled water in the supply pipes, and prevention of such absorption of heat requires the installation of pipe insulation which is expensive and which is likely to deteriorate rapidly.

Accordingly, it is an object of this invention to provide an economical and efficient system capable of furnishing either heating or cooling to the spaces in a building as required by those respective spaces.

It is another object of this invention to provide a system which is capable of furnishing either heating or cooling to the spaces in a building, as required, without the use of a central chiller and without the necessity of distributing low-temperature chilled water throughout the building.

It is a further object of this invention to provide a system capable of removing heat from certain spaces in a building and, rather than wasting this heat, furnishing said heat to the spaces in the building which require heating.

It is a still further object of this invention to provide units for installation in the various spaces of a building, such units being controllable at will by the persons in those respective spaces to produce comfortable temperatures in those spaces.

It is still another object of this invention to provide a heating and air-conditioning system having sufficient flexibility to produce comfortable temperatures in rooms which are occupied while not wasting energy in maintaining comfortable temperatures in other spaces of the building which may not be in use.

Briefly, these and other objects of our invention have been fulfilled by providing a system having a central source of heat which is furnished to a heat-transfer fluid that is circulated to the various spaces in the building which may require heat. Each of these spaces is also provided with an air-conditioning unit, for use when cooling is required, in which the condenser of the air-conditioning unit can be cooled by means of the heat-transfer fluid flowing from the central source. By various settings of valves in the system, heat removed from the medium in one space of the building can be rejected, through the condenser of the air-conditioning unit in that space, to the heat-transfer fluid, which then conveys the heat to other spaces, where it raises the temperature of the media in those spaces by flowing through hot-water coils or other heat-transfer devices.

For a complete understanding of this invention, reference should now be made to the following detailed specification, taken in conjunction with the drawings, in which:

FIGURE 3 is a graphic representation of a reset water-temperature schedule for the water (or other heat-transfer fluid) supplied to the various units of this system, as a function of temperature of the air outside the building;

Figure 1:
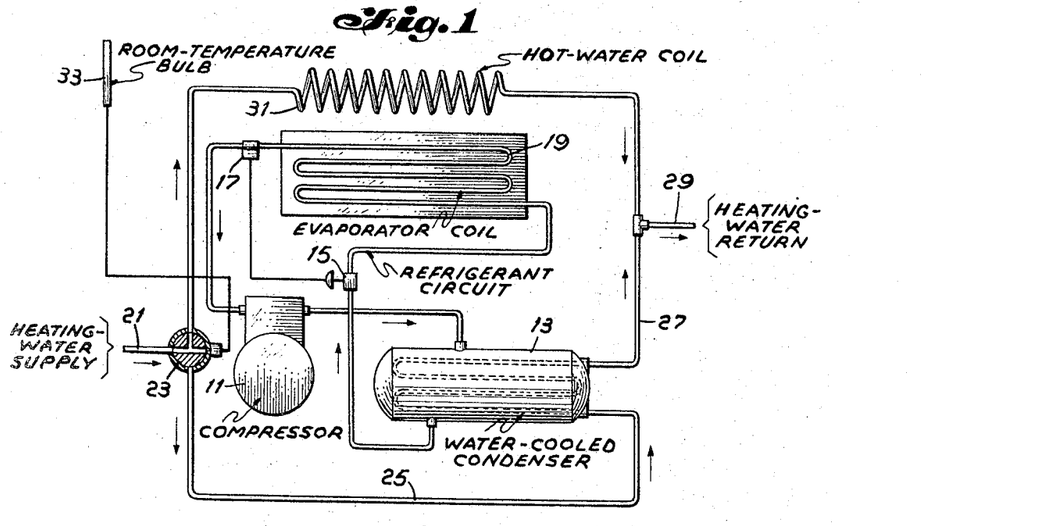
FIGURE 1 is a schematic diagram of one type of combined heating and air-conditioning unit which may be employed in each of the spaces of a building.

Turning now to FIGURE 1 of the drawings, it is to be noted that one of the basic sub-assemblies of the system according to the invention is a unit which may be installed in any of the spaces whose temperature is to be controlled. This unit comprises a self-contained air conditioner having a condenser which, instead of being cooled by the outdoor atmosphere, may be cooled by water furnished to the unit from the central heating-water supply.

The air-conditioning unit includes a compressor 11, a water-cooled condenser 13, a pressure-reducing device 15 such as an expansion valve controllable by means of a sensing device 17, and an evaporator coil 19, these components being coupled together in series relationship to accomplish the refrigeration cycle when cooling of the medium in the space is required. During the time when cooling of the medium in the space is being accomplished, heat-transfer fluid such as water from the central heating-water supply line 21 is furnished through a 3-way valve 23 and a pipe line 25 to flow through the water-cooled condenser 13, thereby absorbing the heat which is rejected in the water-cooled condenser by the refrigerant flowing in the refrigeration circuit. Having passed through condenser 13, the water is discharged through a line 27 into the heating-water return line 29, whence it is circulated through a water cooler, if necessary, or is used to furnish heat to other spaces in the building that may require heating. It is to be noted that, when cooling is required, the compressor 11 of the refrigeration apparatus is running, thereby circulating the refrigerant through the other components of the refrigeration apparatus. Concurrently a fan or blower, not shown, circulates the air or other medium in the space into contact with the evaporator coil 19, which removes heat from the air. During the operation of this cooling process, 3-way valve 23 is set in such a way that sufficient water from the central heating-water supply line 21 is directed into pipe line 25 and thence through the cooling tubes of water-cooled condenser 13 to maintain the temperature of the refrigerant leaving the condenser 13 at the desired level. Three-way valve 23 may be adjusted in a proportional manner so that some of the water furnished thereto from central heating-water supply line 21 is directed through pipe line 25 to cool condenser 13 while the remainder of the water arriving at 3-way valve 23 from the central heating-water supply line 21 is directed through a heat-transfer device such as hot-water coil 31 and thence into the heating-water return line 29. Except when air is to be dehumidified and then reheated, it is desirable to have 3-way valve 23 positioned in such a way that the water from central heating-water supply line 21 passes either to condenser 13 or through hot-water coil 31 but not through both simultaneously. When cooling of the air in the space is required, 3-way valve 23 may be set to direct water through the condenser 13, by means of a bulb 33 which senses the temperature of the air or other medium in the space. Through a solenoid or other servo control, the signal from bulb 33 sets 3-way valve 23 to its desired position in which no water is furnished to hot-water coil 31, but in which water is furnished to condenser 13 from which it extracts heat and then passes on to heating-water return line 29.

When heating of the medium in the space is required, the refrigeration apparatus in that space is usually out of operation, and the bulb 33 causes 3-way valve 23 to be set in such a way as to direct hot water from the central heating-water supply line 21 through hot-water coil 31, where it gives up heat to the air in the space and then passes on to heating-water return line 29.

Figure 2:
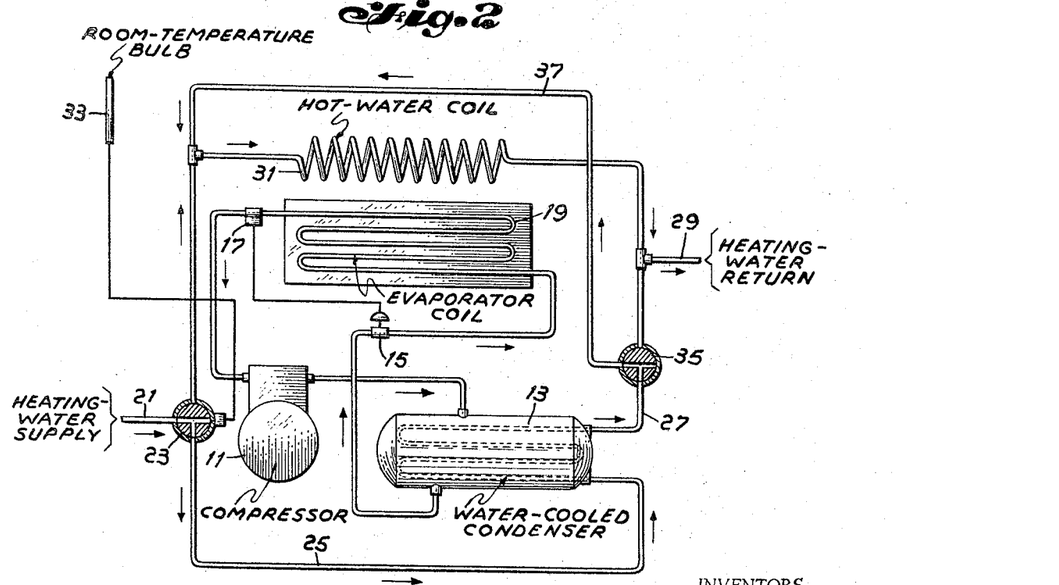
FIGURE 2 is a schematic diagram of another type of combined heating and air-conditioning unit for use in the respective spaces of a building, and providing a feature in addition to those of the unit of FIGURE 1 in that the air, having been dehumidified, can then be reheated to a comfortable temperature.

Turning now to FIGURE 2 of the drawings, we find a schematic representation of a combined heating and air-conditioning unit which comprises the components included in the unit of FIGURE 1 and, in addition, supplemental components to permit the reheating of air which has been cooled and dehumidified by contact with the outer surface of evaporator coil 19. The supplemental components include a second 3-way valve 35, between line 27 and heating-water return line 29. Three-way valve 35 may be set to direct water from condenser 13 either into heating-water return line 29 or through a feedback line 37 to the input end of hot-water coil 31 whereby heat may be taken from water leaving condenser 13 and used to warm air passing over hot-water coil 31 after contact with evaporator coil 19.

In the operation of the unit of FIGURE 2, when heating of air is to be accomplished, the refrigeration apparatus is out of operation, and the room-temperature thermostat or bulb 33 causes 3-way valve 23 and 3-way valve 35 to be set in such positions that hot water from the heating-water supply line 21 flows directly through hot-water coil 31 to the heating-water return line 29. When the room-temperature thermostat or bulb 33 senses a rise in temperature of the air such that cooling is required, the refrigeration apparatus is started, and 3-way valves 23 and 35 are operated to positions such that the flow of water to hot-water coil 31 from 3-way valve 23 is cut off and water flows from 3-way valve 23 through pipe line 25 to condenser 13, whence the water flows through 3-way valve 35 to the heating-water return line 29.

Now, if air which has passed over the evaporator coil 19 and has lost some moisture by condensation on the outer surface of the evaporator coil is to be reheated to a comfortable temperature, 3-way valve 35 can be adjusted to such a position that a desired proportion of the water leaving condenser 13 is diverted by 3-way valve 35 through feedback line 37 to the input end of hot-water coil 31, and through the hot-water coil to heating-water return line 29. This "reheating" feature is an optional arrangement which in many circumstances is very desirable in order to maximize the comfort of the occupants of the air-conditioned space.

Summarizing once again the operation of the units as shown in either FIGURE 1 or FIGURE 2, it may be pointed out that a blower continuously circulates the air in the conditioned space so that it repeatedly comes in contact with evaporator coil 19 and hot-water coil 31. When heating is required, the position of 3-way valve 23 is such that hot water passes through hot-water coil 31, causing the air to be warmed. When the temperature of the ambient air rises to such a level that cooling is required, 3-way valve 23 is caused by the room-temperature thermostat or bulb 33 to be positioned so that water from the heating-water supply line 21 passes through the condenser 13. Concurrently, compressor 11 is activated to produce refrigeration which cools the air as it flows over the evaporator coil 19.

In the foregoing paragraphs, the tacit assumption has been made that water of the proper temperature is available from the heating-water supply line 21. It has been found that the system and units according to the invention function most efficiently if the temperature of the supply water follows a schedule such as that which is illustrated by the graph of FIGURE 3. This graph shows a typical variation of the temperature of the water supplied to the units, as a function of the temperature of the outdoor air. The water-temperature schedule illustrated in FIGURE 3 comprehends a range of supply-water temperatures such as would be suitable for efficient performance of a system in accordance with this invention for outdoor temperatures not only when heating is required but also when both heating and cooling may be simultaneously required, and further, when only cooling is required.

It has been found that the efficient operation of a system according to this invention is most likely if a linear variation of supply-water temperature with outdoor air temperature in the heating range is employed. In order to maintain such a linear variation of temperature of the supply water, it has been found desirable to maintain a constant water temperature in the boiler from which the supply water is derived, and to vary the temperature of the supply water itself by controlling the flow of water through a line which bypasses the boiler. By this means, a desired proportion of the water from the heating-water return line 29 may be re-supplied directly to the heating-water supply line 21 without passing through the boiler. The flow of this water directly from the return line to the supply line is adjusted so that, when it is mixed with the water which has been heated by the boiler to the constant temperature of the boiler, the temperature of the mixture is the desired supply-water temperature shown in the plot of FIGURE 3.

The way in which this type of system operates may be illustrated by reference to FIGURES 4–9. Taking the system shown schematically in FIGURE 6, for instance, it will be seen that a pump 41 circulates water from heating-water return line 29 through a 3-way valve 43 which proportions the flow of water between the boiler 45, or other source of heat, and a bypass line 47 which bypasses water around the boiler without passing therethrough. The heated water from the boiler 45 is mixed with the water from bypass line 47 and enters another 3-way valve 51, which determines whether any of this mixture of water should pass through a water cooler 53 on its way to be supplied to the individual units. Water cooler 53 may include a coil 55 having a fan 57 mounted on a motor 59 for blowing air through coil 55 to cool the water passing therethrough. In order to increase the cooling capacity of coil 55, a source of water spray may be provided, together with automatic controls for turning on the water spray if the temperature of the supply water passing through coil 55 exceeds a certain level, such as 100° F. The water cooler 53 may include a wetted pad for the air to pass through before reaching coil 55. Passage of the air through the wetted pad will cool it by virtue of evaporation of the water in the pad. In general, such a water cooler should be operated without external water cooling so long as the cooling capacity of the water cooler is adequate without such external water cooling. A pump 61 may, if desired, be provided in order to circulate through coil 55 that proportion of the water which is directed thereto by 3-way valve 51. The design of coil 55 aids in determining whether such a pump is needed. The water at the output of coil 55 is mixed with any water which may have been directed past water cooler 53 without passing therethrough. This mixture then becomes the supply water of which the temperature should follow a schedule such as that illustrated in FIGURE 3.

The temperature of the supply water may be sensed by a strap-on bulb or other temperature-sensing device 63 which gives an output signal that may be fed through an electrical or pneumatic conductor to a controller 65. Another input to controller 65 may be an electrical signal from an outdoor thermostat 67. Thus, the signals which are input to controller 65 are represented respectively by the quantities plotted along the axis of abscissas and the axis of ordinates of the graph of FIGURE 3. That is to say, the function of controller 65 is to produce a control signal such that the temperature of the supply water is maintained on the curve illustrated in FIGURE 3 for each value of outdoor air temperature as sensed by outdoor thermostat 67. This control signal from controller 65 may be fed through respective electrical or pneumatic conductors to control the positions of 3-way valve 43 and 3-way valve 51. These are the valves which determine the proportionate amount of water that is bypassed around boiler 45 and the proportionate amount of water that is bypassed around water cooler 53.

Returning to the graph of FIGURE 3, the various modes of operation of the system may be summarized with respect to the point of operation on the graph of supply-water temperature of FIGURE 3, as follows:

From A to $A_1$ Heating is available in all spaces of the building, while cooling is available only by ventilation. The boiler is in operation.

From $A_1$ to B Heating is available in all spaces of the building, while cooling is available either by ventilation or by refrigeration.

Point $A_1$ falls at a supply-water temperature which represents the general upper limit of acceptable temperatures for water to pass through a water-cooled condenser. For the purpose of a system of this type, we have found that a temperature of approximately 115° F. is the general upper limit of water temperature for this purpose. Inasmuch as, between points A and $A_1$, the supply water exceeds this acceptable upper temperature limit, cooling by refrigeration is not available, and the only available cooling would be furnished by ventilation. Inasmuch as the outdoor air temperatures for which the supply-water temperature exceeds the acceptable level are close to or below the freezing point, this limitation on the operation of the system is not a serious one because refrigeration for air conditioning is not likely to be needed with such low outdoor air temperatures. Once again, between points $A_1$ and B the boiler is operating, and heating is available in any zones where it may be required, while cooling either by ventilation or refrigeration is also available.

Between point $A_1$ and point C of FIGURE 3, the same selection of thermal effects is available without requiring the operation of the boiler. It is within this range of temperatures that the system according to the invention operates as a heat pump. In this mode of operation, the water or other heat-transfer fluid absorbs heat from the medium in one space which requires cooling and delivers this heat to the medium in another space which requires heating. The absence of necessity for running the boiler points up the contribution to efficiency which results from this feature.

Between point C and point D on FIGURE 3, heating is available by heat-pump action, and cooling is available either by ventilation or by refrigeration. Once again, the boiler is not in operation, but water cooler 53 is in operation with air being forcibly moved through it.

When the outdoor air temperature has reached such a level that the supply-water temperature has increased to the general upper limit which is acceptable for cooling a condenser, the curve of FIGURE 3 reaches point D, and it becomes necessary to begin to cool water cooler 53 by means of external water rather than merely by forcibly circulated air. The use of external cooling water for cooling the water cooler 53 permits the supply-water temperature to be maintained without exceeding the upper limit of acceptable supply-water temperatures even as the outdoor air temperature exceeds levels such as 100° F.

It will be understood that the reset water-temperature schedule of FIGURE 3 is not to be considered in a limiting sense but is presented as an illustration of a typical variation of supply-water temperature as a function of outdoor air temperature in a system according to this invention, properly adjusted for efficient operation.

Once again, it may be pointed out that pump 41 runs at all times in order to circulate supply water to all those units which are turned on. The boiler 45 operates only between points A and B on the curve of FIGURE 3, and the pump 61, which circulates water through water cooler 53, operates only for outdoor air temperatures above that which is shown at point C. The positions of 3-way valves 43 and 51 are modulated in accordance with the output signal from controller 65 for reflecting the outdoor air temperature and any departure of the supply-water temperature from the optimum temperatures represented by the curve of FIGURE 3.

In FIGURES 4–9, there is illustrated a system in accordance with the invention, in which the assumption has been made that the system serves a building in which there are two different kinds of zones so far as heating and cooling requirements are concerned. This type of situation prevails, for example, in buildings which contain outside rooms having windows and walls in contact with the outdoor air, and inside rooms or spaces in which there are no windows and which have interior walls that are not in contact with outdoor air. Taking the outside rooms together as a first zone, and the inside rooms together as a second zone, it becomes possible to design a heating and air-conditioning system in which the two types of spaces may simultaneously be given different kinds of thermal treatment. In FIGURES 4–9 of the drawings, the heating and air-conditioning equipment in the outside rooms is shown schematically on the left-hand side of each figure and is marked "Exterior Zone." The heating and air-conditioning equipment in the inside rooms or spaces, on the other hand, is shown on the right-hand side of each figure and is designated "Interior Zone." For each zone in the system illustrated in each figure, a notation is made on the figure as to whether heating or cooling is taking place in that zone, and whether heating and cooling may both be taking place in different spaces in each such zone. The arrangement of the central system, including the boiler and the water cooler, is similar in FIGURES 4–8 but the setting of 3-way valves differs from one figure to the next in order to produce different thermal effects which may be called for by the existence of different outdoor-air temperatures. In the situation represented by each figure, a typical outside-air temperature is specified, and the general nature of the arrangement of connections between pieces of equipment in the two zones is specified. Further, a typical supply-water temperature, in accordance with a curve such as that which is shown in FIGURE 3, is specified consistent with the outdoor-air temperature assumed in each figure.

Figure 4:
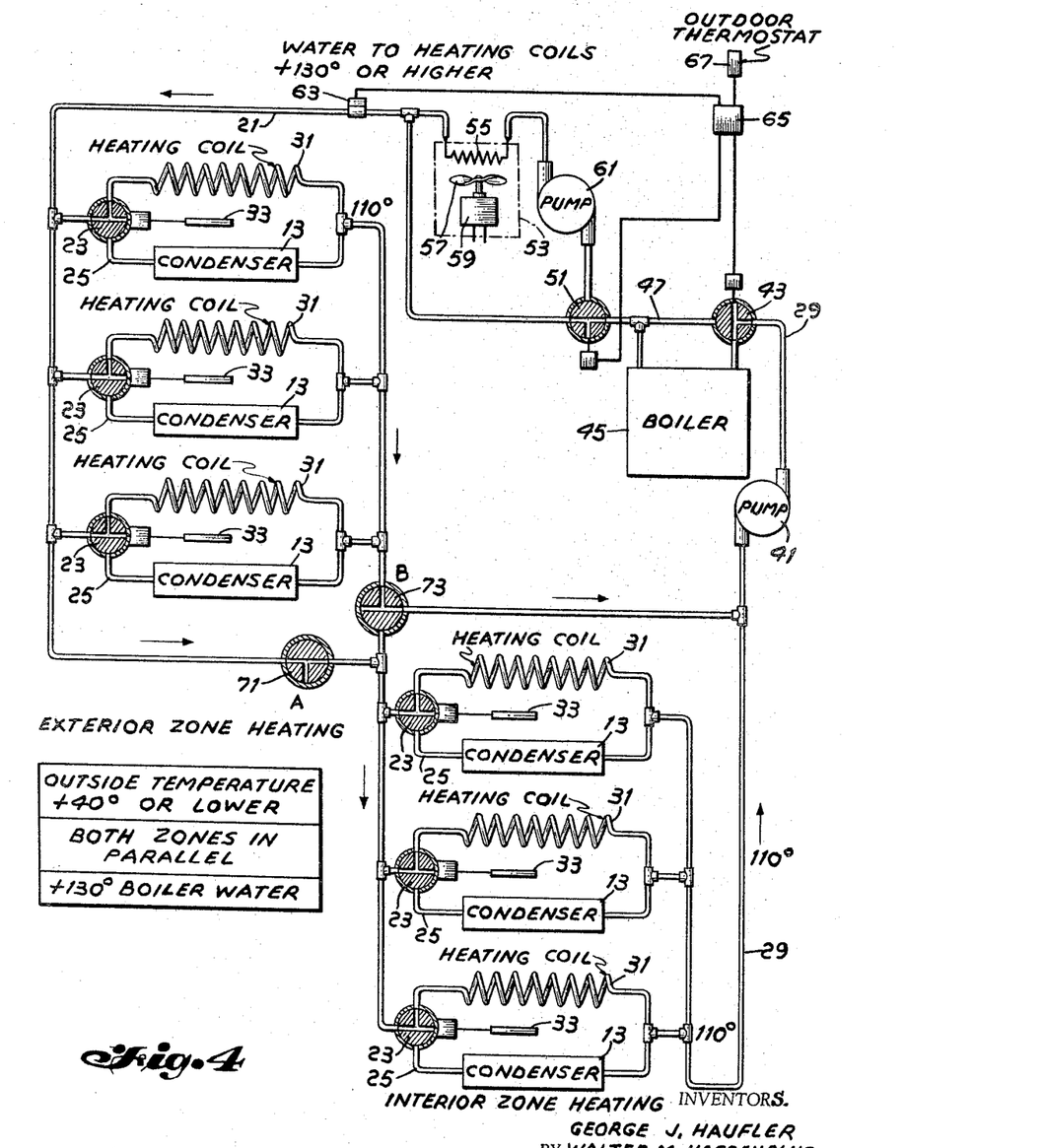
FIGURE 4 is a schematic diagram of a system according to the invention, in which the space in a building to be conditioned is divided into two zones, both of which are to be heated because outdoor temperatures are assumed to be very low.

In FIGURE 4 of the drawings, as in the other figures which follow it, a system according to the invention has been divided into an exterior zone and an interior zone for the purpose of illustration of the principles of the invention. The number of combined heating and air-conditioning units in each such zone is illustrated in these figures as being the same; however, it should be reiterated that there is no necessity to divide the two zones equally so far as numbers of units in the respective zones are concerned. So long as the flow of water or other heat-transfer fluid through the zones is properly balanced, the numbers of units in the respective zones may be quite different. For the purposes of this specification, it is assumed that the spaces in the exterior zone may require heating when at least some of the spaces in the interior zone may require either heating or cooling. Furthermore, it may be that some of the spaces in the exterior zone will require either heating or cooling when all of the spaces in the interior zone require cooling. When the thermal requirements of the medium in a particular space change from heating to cooling or vice versa, the change-over may be accomplished by automatic switching of 3-way valves under the control of room-temperature thermostats or bulbs, as will be made clear from a discussion of FIGURE 4 and the succeeding figures of the drawings.

When the system is operating as illustrated in FIGURE 4, all the units of the system are on the "heating cycle" and are supplied with water from the boiler which may have a temperature of 120° F. or higher, and which may range as high as 200° F. A 3-way valve 71 in the heating-water supply line and a 3-way valve 73 in the heating-water return line are positioned in such a way that all the units of both the exterior zone and the interior zone are effectively connected in parallel and so that the heating water entering each unit has a similar temperature and the water emerging from the respective units may have similar temperatures if the operation of each of the units is adjusted to a comparable level.

According to the reset water-temperature schedule of FIGURE 3, a boiler-water supply temperature of 120° F. supplied to the units shown in FIGURE 4 would correspond to an outdoor-air temperature of 50° F. It will be understood that, if the outdoor-air temperature were lower than 50° F., the temperature of the water supplied by the boiler to the respective units would increase in accordance with the curve of FIGURE 3. The 3-way valve 23 at the input side of each unit is positioned so that the supply water from the boiler is directed through the hot-water coil 31 of each unit, where it gives up heat to the air in the space to be heated and emerges from the unit at a temperature of the order of 110° F. The water then enters the heating-water return line 29 and is circulated back to the boiler by means of pump 41. When the return water reaches the boiler, a given portion of it will pass through the boiler in accordance with the setting of the 3-way valve 43 which establishes the amount, if any, of return water that is to be bypassed rather than passing through the boiler. It is to be noted that, in the arrangement illustrated in FIGURE 4, none of the supply water from the boiler is passed through the condensers of the respective units. When all units of the system are on the "heating cycle," the refrigeration apparatuses, including the condensers, are out of operation and out of the water circuit. It will be understood that, in FIGURES 4–9 of the drawings, only the condensers 13 of the respective units have been shown in the drawings. Each such unit actually includes a complete closed-cycle refrigeration apparatus which circulates refrigerant through the condenser, which condenses the high-pressure gaseous refrigerant entering it. For economy of space, the refrigerant circuit of each unit is not shown in FIGURES 4–9 of the drawings.

Once again, it may be pointed out that the position of 3-way valve 23 at the input end of each unit is controlled by means of a room temperature thermostat, or a bulb 33, which produces a signal that may be fed to a pneumatic or electro-mechanical device for positioning the 3-way valve. It will be understood that alternative methods for controlling the positions of the respective 3-way valves may be employed. Furthermore, manual controls, operable in accordance with the wishes of the occupants of the air-conditioned space, may be employed to override the automatic control action of the room-temperature thermostat and to position the 3-way valve 23 in such a way as to proportion the flow of water between condenser 13 and hot-water coil 31 in order to achieve the comfort of the occupants of the space. Ordinarily, except for reheat purposes, it will be best if either the heating coil or the refrigeration apparatus of each unit is in use but not both simultaneously. Once again, it is to be noted that heating is taking place in both the exterior zone and the interior zone of the system as illustrated in FIGURE 4 of the drawings. This mode of operation falls on the left-hand linear portion of the reset water-temperature schedule of FIGURE 3.

Figure 5:
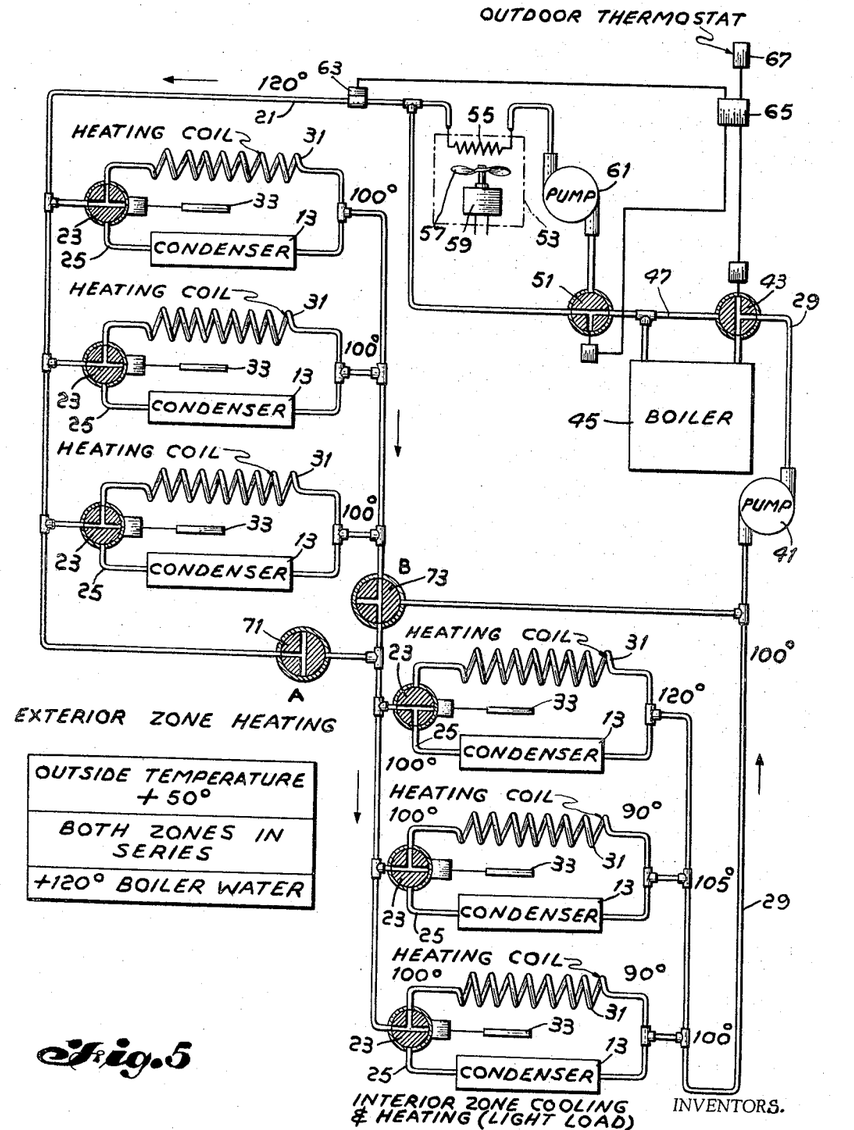
FIGURE 5 is a schematic diagram of a system according to the invention, in which the valves of the system are set so that a first zone in the building will be heated while certain spaces in a second zone of the building may receive either heating or cooling, as might be required in the spring or fall when outdoor temperatures are approximately 50° F.

Turning now to the mode of operation of the system as illustrated in FIGURE 5, the assumption is made that the outside-air temperature has risen to the neighborhood of 50° F., thereby dictating the lowering of the temperature of the supply water to approximately 120° F. in accordance with the reset water-temperature schedule of FIGURE 3. In this mode of operation, the air or other medium in the spaces in the exterior zone will in all probability require heating, while some of the spaces in the interior zone may require cooling and other spaces in the interior zone may require a small amount of heating. In order to achieve this mode of operation, 3-way valve 71 is closed, thereby interrupting the flow of supply water from the supply line of the exterior zone to the supply line of the interior zone. On the other hand, 3-way valve 73 is positioned in such a way as to direct the flow of water from the output sides of the units in the exterior zone to the input sides of the units in the interior zone. This setting of the 3-way valves effectively causes the units of the exterior zone to be in series relationship with the units of the interior zone.

For purposes of illustration, the 3-way valves 23 at the respective inputs of the units in the exterior zone are positioned in such a way that the supply water passes through the heating coil of each such unit in order to produce heating of the respective space where the unit is located. However, the respective settings of the 3-way valves 23 of the units in the interior zone are such that the water entering one of the units is passed through the condenser 13 of that particular unit rather than the heating coil 31. This permits cooling of the medium in the particular space where that one unit is located. On the other hand, the 3-way valves at the input end of the other units in the interior zone are shown positioned to pass the water through the heating coils to produce the small amount of heating which is assumed to be required in these other spaces of the interior zone.

For purposes of discussion of the system illustrated in FIGURE 5, the assumption has been made that the spaces in the exterior zone require a considerable amount of heating, whereas the spaces in the interior zone under these particular circumstances require little if any heating. Accordingly, it is of interest that the supply water suffers a temperature drop of approximately 20 degrees in passing through the heating coils of the units in the exterior zone, whereas the water passing through the heating coils of the two units on the heating cycle in the interior zone suffers a temperature decrease of only 10 degrees. In the case of the particular unit in the interior zone which is operating on its cooling cycle, and in which the water is passing through the condenser of the refrigeration apparatus rather than through the heating coil, the water increases in temperature by 20 degrees. Thus, the water which is returned to pump 41 is a mixture of some water which has been cooled by passage through a succession of heating coils and of some water which has been warmed by passage through the condenser of a refrigeration apparatus. Although the position of 3-way valve 43 is shown to be such as not to bypass water around boiler 45, it will be understood that it would be possible to bypass a certain amount of water around the boiler so long as the temperature of the supply water furnished to the units of the exterior zone is approximately 120 degrees.

In view of the fact that the water returned to the boiler has a temperature of approximately 100 degrees and the supply water is required to have a temperature of the order of 120 degrees, there is clearly no necessity for passing water through water cooler 53; accordingly, the 3-way valve 51, which bypasses the water cooler 53, is positioned to pass no water through water cooler 53.

Figure 6:
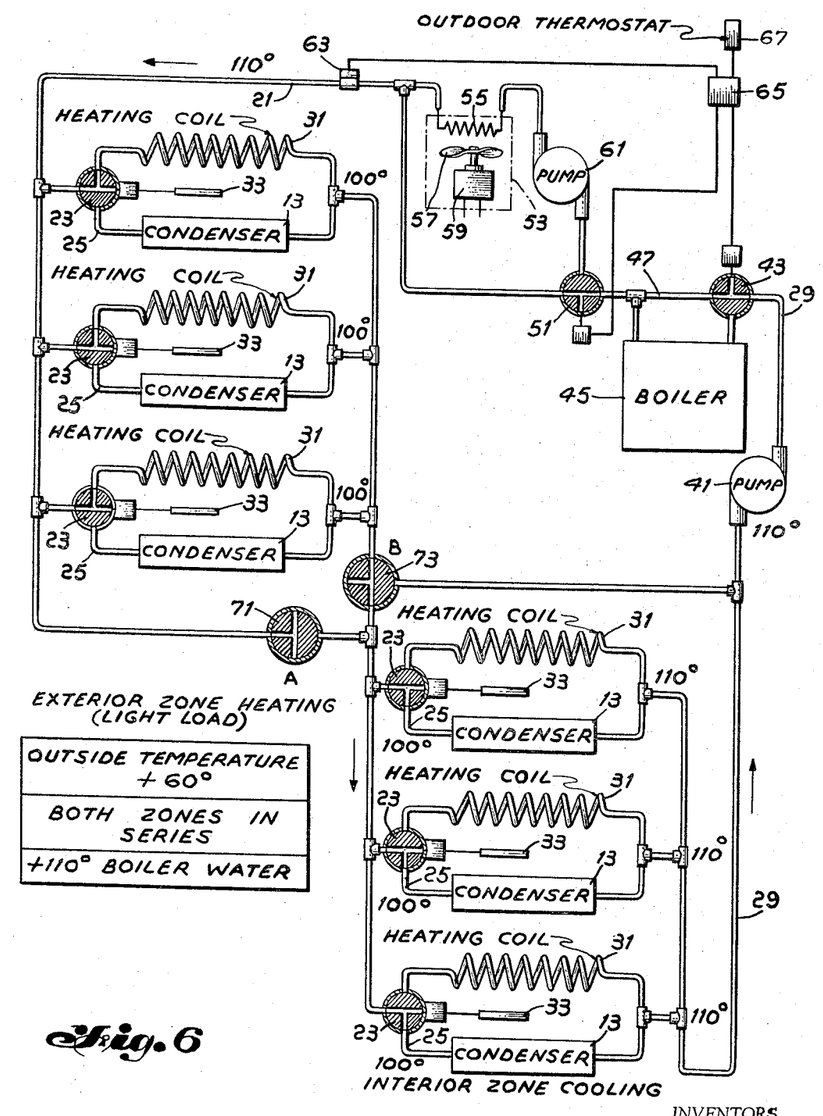
FIGURE 6 is a schematic diagram of a system according to the invention, in which a first zone of the building is furnished a small amount of heating while a second zone is simultaneously cooled, as might be required when outdoor temperatures are in the neighborhood of 60° F.

Turning now to FIGURE 6 of the drawings, it is assumed that the outside-air temperature has risen to approximately 60° F., a temperature which, according to the reset water-temperature schedule of FIGURE 3, corresponds to a supply-water temperature of 110° F. Under these conditions, the water supplies only a light heating capacity on the units in the exterior zone, while cooling is being demanded of the units in the interior zone. Three-way valves 71 and 73 remain in the same positions as they occupied in the mode of operation illustrated in FIGURE 5. However, a 3-way valve 43 has now been repositioned to bypass water around the boiler. Likewise, the position of 3-way valve 51 is such that water is bypassed around the water cooler. Under these conditions, the units of the exterior zone are connected in parallel, the units of the interior zone are connected in parallel, and the parallel combination of units in the exterior zone is in series with the parallel combination of units in the interior zone. In view of the fact that both the boiler and the water cooler are bypassed in this mode of operation, the only substantial amount of heat either added to or taken away from the heat-transfer fluid as it is circulated by pump 41 is the heat which is given up to the air while passing through the units of the exterior zone and the heat which is taken from the condensers of the refrigeration apparatuses in the respective units of the interior zone. Thus, the heat absorbed by the heat-transfer fluid while passing through the interior zone is given up by the heat-transfer fluid while passing through the units of the exterior zone. Under these circumstances, the system according to our invention is operating as a heat pump, and is serving to move the heat from spaces where it is not needed to the spaces where it is needed, without the addition of heat by the central system. This mode of operation clearly permits a considerable saving in fuel and assures comfortable temperatures throughout the building during those seasons when it would otherwise be necessary to run the boiler merely to supply a small and intermittent heating load.

It is of interest to point out at this time that each unit of the system according to this invention should preferably be constructed in such a way that the water-cooled condenser 13 is physically located in a compartment of the unit cabinet which is separate from the compartment that accommodates the evaporator coil 19, which produces the cooling effect through contact with the air circulated therethrough. This physical separation of the water-cooled condenser from the evaporator coil insures that the circulated air from the space to be cooled will be able to give up its heat to the refrigerant flowing through the evaporator coil without interference due to the presence of any other component of the refrigeration apparatus. Furthermore, the physical isolation of the water-cooled condenser permits the condenser to serve as a heat exchanger in which the refrigerant of the refrigeration apparatus gives up its heat to the water, or other heat-transfer fluid, which comes to the condenser from the heating-water supply line 21 and the pipe line 25 via the 3-way valve 23.

Figure 7:
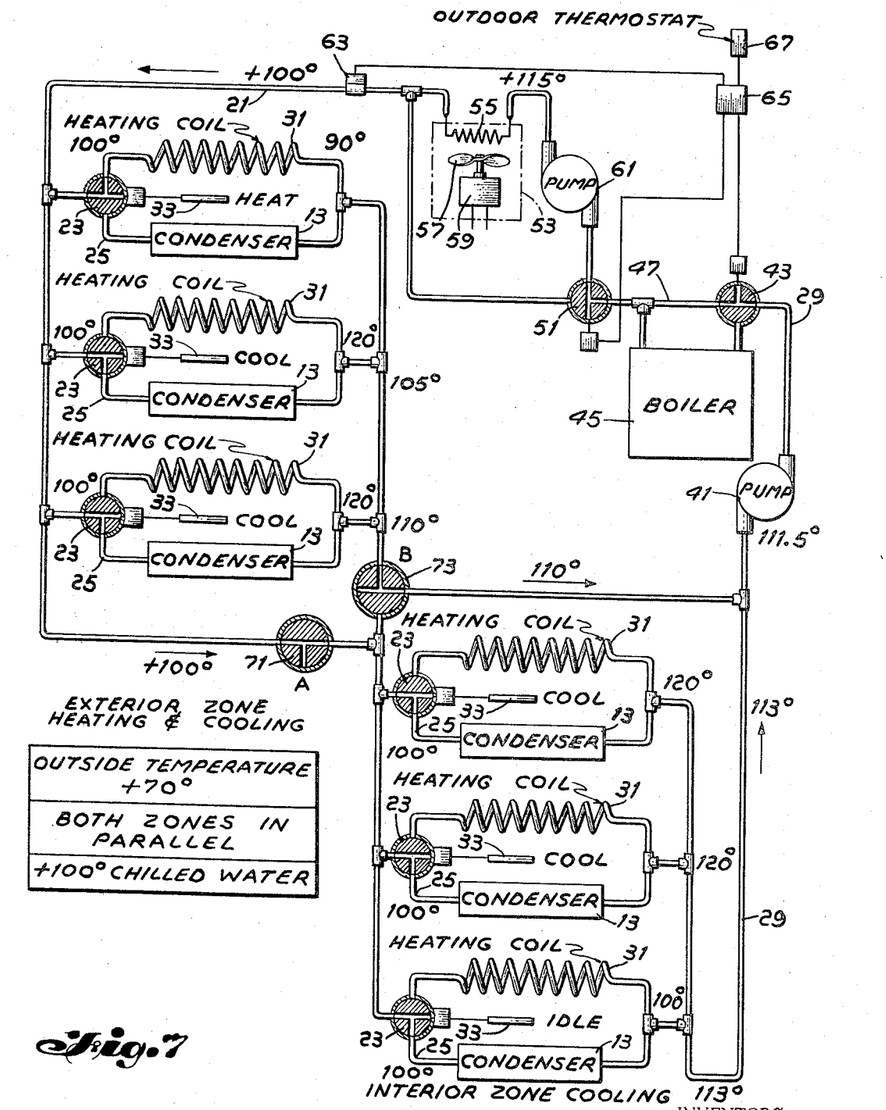
FIGURE 7 is a schematic diagram of a system according to the invention, in which a first zone of the building receives both heating and cooling in different spaces, while certain spaces of another zone are cooled and still others require no alteration in temperature, as might be the case with outdoor temperatures of 70° F.

Now, in FIGURE 7 of the drawings is illustrated the mode of operation in which the outside-air temperature is approximately 70° F., which corresponds on the reset water-temperature schedule of FIGURE 3 to a supply-water temperature of 100° F. Under these circumstances, some of the spaces in the exterior zone are likely to require cooling while others require heating. For these conditions, the spaces in the interior zone of the building are almost sure to need cooling. In order to illustrate the flexibility of the system according to the invention, FIGURE 7 illustrates the conditions when two of the units in the interior zone are in cooling operation, while one of the units in the interior zone is idle. These conditions might well prevail when one of the interior rooms is unoccupied or not in use, and there is no need to expend energy in conditioning air therein. In the mode of operation illustrated in FIGURE 7, 3-way valves 71 and 73 have been positioned to achieve parallel operation of the units of the exterior and interior zones, as was the case in the mode of operation illustrated in FIGURE 4. However, 3-way valve 43 is now positioned in such a way as to bypass the boiler, which is not in operation, and 3-way valve 51 is now positioned in such a way that pump 61 causes the water to flow through water cooler 53. Consequently, the supply-water temperature is now in the neighborhood of 100° F., while the temperature of the water returned from the units to the water cooler 53 is in the neighborhood of 111.5°. Inasmuch as these temperatures depend considerably upon the settings of the various units in the two zones, these temperatures are typical temperatures which are presented for illustrative purposes only and are not to be construed in any limiting sense.

In order to illustrate further the flexibility of the system according to the invention, it has been chosen to assume that one of the units in the exterior zone is in heating operation while the other units of the exterior zone are cooling. Thus, the water supplied to the units of the exterior zone is divided among them, with the water passing through one of the units giving up heat in passing through the heating coil of that particular unit, while the water passing through the water-cooled condensers of the other units in the exterior zone absorbs heat while passing through those condensers. In accordance with a typical schedule of temperature changes, the water passing through the heating coil of the first-named unit falls in temperature from 100° to 90°, while the water passing through the condensers of the other units of the exterior zone rises in temperature from 100° to 120°. Once again, the water going to the return line is a mixture of water which has been cooled by passage through a heating coil and water which has been warmed by passing through condensers of respective refrigeration apparatuses. The positions of the 3-way valves 23 at the input sides of the respective units of the exterior zone are clearly illustrated in FIGURE 7, thereby showing the way in which these 3-way valves direct the supply water to the heating coil of a unit or to the condenser of the refrigeration apparatus of that unit. In the case of the lowermost represented unit of the interior zone, the refrigeration apparatus of that particular unit is not in operation, and hence the water passing through the condenser thereof does not absorb heat from passing through the condenser. Accordingly, the temperature of the water leaving this particular unit is the same as the temperature of the water entering the unit. The operating conditions which are illustrated in FIGURE 7 correspond to point B on the reset water-temperature schedule of FIGURE 3, which marks the point where water cooler 53 begins operation.

Figure 8:
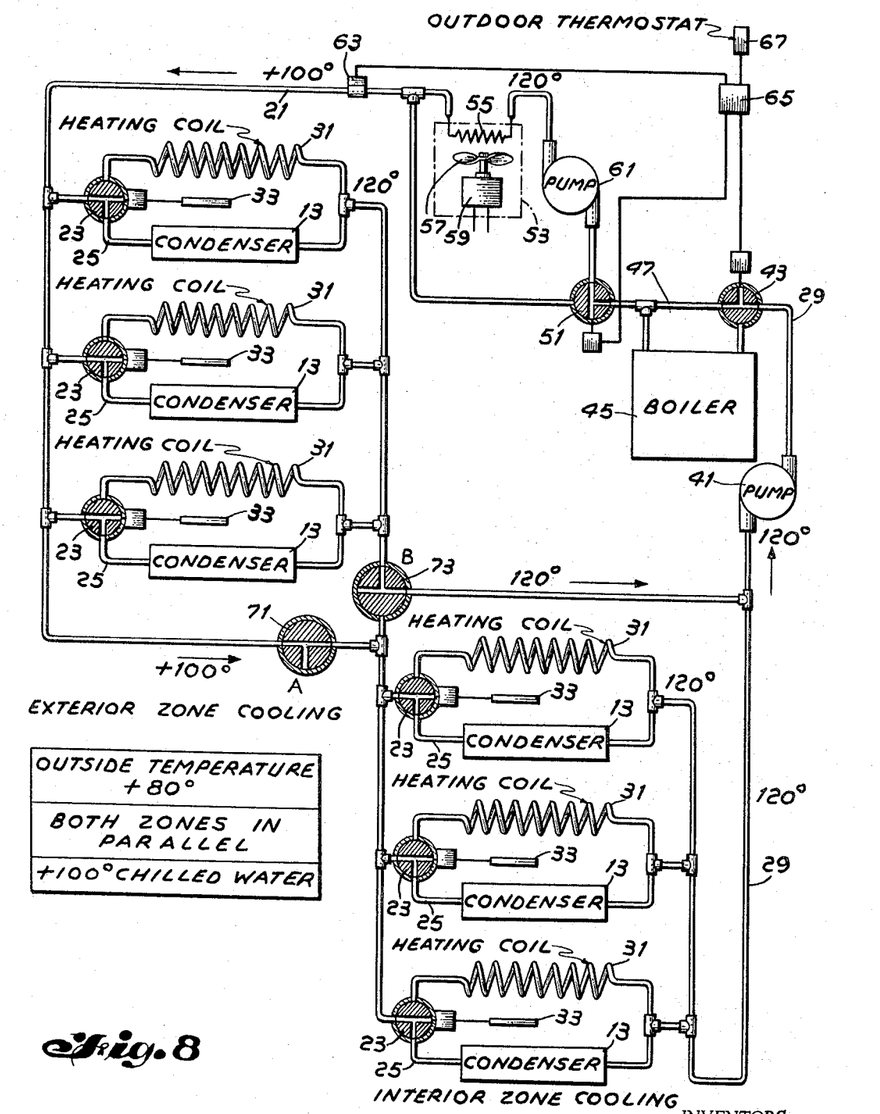
FIGURE 8 is a schematic diagram of a system according to the invention, in which all spaces in the building are receiving a moderate amount of cooling, as might be the case with outdoor temperature in the neighborhood of 80° F.

Let us turn now to the operating conditions which are illustrated in FIGURE 8 of the drawings, and which correspond to point C on the reset water-temperature schedule of FIGURE 3. At this point, the outside-air temperature is 80° F., which calls for a supply-water temperature of 100° F. in accordance with the reset water-temperature schedule of FIGURE 3. The 3-way valves 71 and 73, once again, are set so that the units of the exterior zone are effectively connected in parallel with those of the interior zone and, once again, 3-way valve 43 is positioned in such a way as to bypass the boiler, which is not in operation. As the outside air temperature has reached 80°, the assumption is made that there are no units which are now in heating operation, even in the exterior zone, and that all units of the interior zone are also in operation on the cooling cycle. Hence, under these conditions, the temperature of the supply water entering each of the units of the system is substantially the same, and the temperature of the water leaving each of the units of both zones is also substantially the same. These temperatures respectively are 100° and 120° F. It will be understood that, in practice, this degree of uniformity would be very unusual in view of the different settings which usually exist in the different units of the system. However, for purposes of illustration, this choice of conditions represents a satisfactory condition.

With the water returned to the water cooler 53 at a temperature of 120° F., the water cooler must remove enough heat therefrom to supply water to the units at a temperature of approximately 100°. In other words, the heat which was picked up by the water in passing through the condensers of the units must be rejected to the water cooler. Under these conditions, the units of the system, the water cooler 53, and the pipes or conduits which connect them are together operating as a heat-disposal circuit.

The water cooler 53, or other heat-rejection means, may, as has been pointed out, comprise any suitable heat-exchange device having sufficient cooling capacity to lower the temperature of the circulated water to a level such that it can satisfactorily cool the condensers of the air-conditioning units. While it is desirable for the water cooler to operate as long as possible without the use of external cooling water, provision of facilities for cooling by external water is desirable in order to be able to reduce the circulated-water temperature sufficiently when the outdoor-air temperatures rise to the neighborhood of 90° or above.

One of the advantages of the system according to this invention is inherent in the fact that it can be an entirely closed system so far as the heat-transfer fluid is concerned. If the heat-transfer fluid is water, this helps to prevent the formation of scale in the units and in the conduits or pipes. In order to prevent this circulated water from freezing in the portion of the conduits which leads to the water cooler, when the water cooler is not in use, an anti-freeze substance may be added to the water. Furthermore, the piping leading to water cooler 53 may be vented and arranged in such a way as to be self-draining whenever the water cooler is bypassed. Alternatively, a waste valve may be provided which automatically opens when the outside-air temperature drops to a level of about 40° F., in order to permit drainage of the water from the piping leading to the water cooler. To summarize the function of the water cooler 53, it may be reiterated that the water cooler must maintain the temperature of the supply water at a level low enough to permit the water to cool the condensers of any air-conditioning apparatuses which may be in operation, while at the same time maintaining the supply water at a temperature high enough to provide heat to the heating coils of any units which may at that time be in heating operation. If none of the air-conditioning units is in cooling operation, water cooler 53 may be bypassed so that it does not form a part of the central system for circulation of water.

Figure 9:
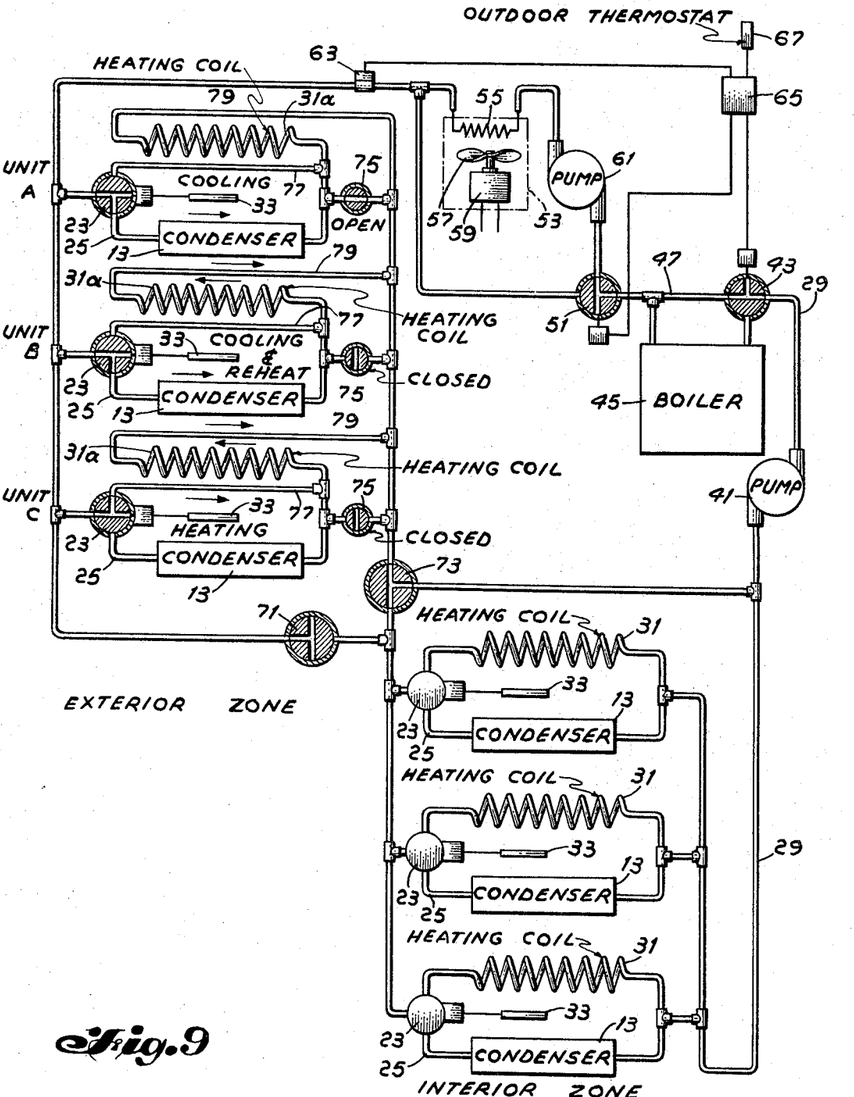
FIGURE 9 is a schematic diagram of a system according to the invention, in which different ones of the units of the system are set respectively for cooling, heating, and a combination of cooling with dehumidification followed by reheating of the air.

Turning finally to FIGURE 9 of the drawings, we find an illustration of a system according to the invention, in which each unit of the exterior zone has been provided with an additional valve 75 which is located at the output end of the unit. Inasmuch as this valve serves only to permit or prevent the flow of heat-transfer fluid to the return line, valve 75 may be a simple "on-off" valve. The piping within each unit in the configuration shown in FIGURE 9 is altered somewhat in that an additional line 77 is provided in order to connect three-way valve 23 with valve 75. Heat-transfer fluid leaving line 77 is directed through hot-water coil 31*a* in a direction such that the fluid can give up heat, thereby warming air which flows over it after being cooled and dehumidified by coming in contact with the evaporator of the air-conditioning apparatus. The heat-transfer fluid, having passed through the hot-water coil 31*a* in such a manner as to reheat the air, is then conveyed by means of still another line 79 to the return water line.

The three units shown in the exterior zone of the system illustrated in FIGURE 9 are adjusted so that a unit which has been designated as "unit A" is in cooling operation, while a unit which has been designated as "unit B" is in cooling operation followed by reheat of air which has passed over the evaporator of the air-conditioning unit. A unit which has been designated "unit C" has its air-conditioning apparatus out of operation and is simply in heating operation.

In unit A of the exterior zone of FIGURE 9, the three-way valve 23 at the input of the unit is positioned to pass the heat-transfer fluid through the condenser of the air-conditioning apparatus, and valve 75 is positioned to allow the heat-transfer fluid to flow into the return line. In this arrangement, neither heating nor reheating is provided.

In unit B, illustrated in the same figure, 3-way valve 23 directs the incoming supply water, or other heat-transfer fluid, through the condenser 13 of the air-conditioning apparatus where it absorbs heat as it cools the refrigerant flowing in the air-conditioning apparatus. Inasmuch as the temperature of the heat-transfer fluid (water) has been raised by passage through the condenser of the air-conditioning apparatus, the water may now be directed back through the hot-water coil 31a of the unit in such a way as to give up heat to the air which has been cooled and dehumidified by passage over the evaporator coil of the air-conditioning unit. The water leaving the hot-water coil is then directed through line 79 to the return water line. In this mode of operation, valve 75 is closed to permit no direct flow of water to the return line.

In unit C of the exterior zone as illustrated in the same figure, the air-conditioning apparatus is not in operation, and heating is produced as the supply water passes through the hot-water coil 31a and thence through line 79 to the return line. In this mode of operation, 3-way valve 23 is positioned to direct the supply water through line 77 and thence into the hot-water coil, while valve 75 is closed to prevent the flow of water from line 77 directly into the return line without first passing through hot-water coil 31a.

The usefulness of the "reheat" type of operation is clear. Inasmuch as there are times when it is desirable to remove excess humidity from the air without leaving the air temperature at an unduly low level, this reheat arrangement permits the temperature to be raised again to a comfortable level after the excess humidity has been removed by condensation on the outer surface of the evaporator coil 19.

In this specification, a thorough description of the preferred embodiments of the system and units according to our invention has been presented. However, it is to be understood that many variations in the nature and arrangement of the components of the system may be made without departing from the essence of the invention. For instance, although reference has repeatedly been made to the use of 3-way valves for the purpose of water-flow control and for diverting water from the hot-water coil to the water-cooled condenser or vice versa, it will be recognized that other control means such as those using 2-way valves, solenoid valves or other types of components might also be employed. In view of the latitude of the variations which might be incorporated into the arrangement of this system, and its units, without departing from the invention, the scope of the invention is to be limited only as set forth in the following claim.

We claim:
A heating and cooling system for respective media in first and second zones, said system including:
 (a) a first heat-transfer device in thermal communication with a medium in said first zone;
 (b) a second heat-transfer device in thermal communication with a medium in a first part of said second zone;
 (c) a refrigeration apparatus comprising a compressor, a condenser, a pressure-reducing device, and an evaporator in series connection for circulation of refrigerant in a closed loop, said evaporator being in thermal communication with a medium in a second part of said second zone;
 (d) a source of heat;
 (e) a heat-transfer fluid;
 (f) a first conduit for circulation of said heat-transfer fluid through said source of heat, said first heat-transfer device, and said second heat-transfer device;
 (g) valve means in said first conduit for directing said heat-transfer fluid through said first and second heat-transfer devices in parallel, without passing through said condenser, when only heating of said respective media in said first and second zones is required, and for directing said heat-transfer fluid through said first and second heat-transfer devices in series, and through said condenser of said refrigeration apparatus in parallel with said second heat-transfer device when heating of said respective media in said first zone and said first part of said second zone is required and when cooling of said medium in said second part of said second zone is required; and
 (h) a second conduit for returning said heat-transfer fluid from said heat-transfer devices and said condenser to said source of heat.

References Cited by the Examiner
UNITED STATES PATENTS

| | | | |
|---|---|---|---|
| 2,715,515 | 8/1955 | Stair | 165—30 X |
| 2,797,068 | 6/1957 | McFarlan | 165—29 |
| 3,127,928 | 4/1964 | Ringquist | 165—22 |
| 3,165,148 | 1/1965 | Soule | 165—29 |
| 3,252,507 | 5/1966 | Conroy | 165—26 X |

MEYER PERLIN, *Primary Examiner.*
ROBERT A. O'LEARY, *Examiner.*
M. A. ANTONAKAS, *Assistant Examiner.*